… …

United States Patent Office 2,970,113
Patented Jan. 31, 1961

2,970,113

STABILIZATION OF 1,1,1-TRICHLOROETHANE

Howard J. Bachtel, Lake Jackson, Tex., assignor to The Dow Chemical Company, Midland, Mich., a corporation of Delaware No Drawing. Filed May 31, 1957, Ser. No. 662,576

11 Claims. (Cl. 252—171)

This invention relates to a composition of matter comprising methyl chloroform and an organic phosphorous compound dissolved therein, and to a method of stabilizing methyl chloroform in the presence of mineral oil.

It is well known that the common chlorinated hydrocarbons, which are solvents for degreasing metals, dry cleaning and other purposes, are subject to decomposition upon contact with metallic surfaces and causes corrosion of such surfaces. It has long been customary to add corrosion inhibitors to such solvents to stabilize them against decomposition and to suppress or prevent corrosive attack upon metal surfaces with which they come in contact. Many agents have been proposed as corrosion inhibitors for such chlorinated solvents, but, generally speaking, the effectiveness of a particular inhibitor for a particular chlorinated solvent cannot be predicted. This is especially true with methyl chloroform as special problems exist with this solvent that do not exist with the other chlorinated solvents. 1,1,1-trichloroethane or methyl chloroform decomposes rapidly and violently in the presence of iron and aluminum whereas the ordinary chlorinated solvent will only slowly decompose and form HCl. Also mineral oil will cause the rapid decomposition of heated methyl chloroform even when present in a concentration of only a few percent, but has little or no known effect upon other chlorinated solvents until it is present in sufficient concentration to substantially raise the boiling point of the solvent. In these and many other ways 1,1,1-trichloroethane differs markedly from the ordinary chlorinated solvents.

Methyl chloroform is a superior oil and grease solvent and is particularly adaptable to vapor degreasing, but the problems encountered in the use of this solvent for this purpose are many. This solvent will be in contact with mineral oils, sulfonated oils, sulfurized oils, and greases of all types at elevated temperatures and for extended periods when used as a vapor degreasing solvent. An effective inhibitor would, therefore, be very desirable so that the excellent solvent properties of this compound could be made available to industry.

It has been stated in U.S. Patents Nos. 2,371,644 and 2,371,645 that monohydric aliphatic alcohols and organic ethers act as inhibitors for certain chlorinated hydrocarbon solvents, particularly when the solvent is in contact with aluminum. These alcohols and ethers, with the exception of 1,4-dioxane, are quite ineffective when used by themselves as inhibitors or stabilizers for methyl chloroform. In may prior application, Serial No. 419,931, filed March 30, 1954 now U.S. 2,811,252, I have shown that 1,4-dioxane and mixtures thereof with minor amounts of secondary or tertiary aliphatic alcohols effectively inhibit the action of methyl chloroform on surfaces of iron and aluminum. This inhibiting effect is obtained at elevated as well as normal temperatures when the metal is immersed in the liquid. In my prior application Serial No. 537,903, filed September 30, 1955 now U.S. 2,838,458, I have shown that 1,4-dioxane in combination with minor amounts of an acetylenic alcohol containing less than 8 carbon atoms is an effective inhibitor for methyl chloroform when in contact with surfaces of iron and aluminum, the protective action of the inhibitor being obtained at elevated as well as normal temperatures whether the metal is in the liquid or the vapor phase. Neither of the above described compositions nor, in fact, any known composition will prevent the decomposition and acid formation of this solvent when small amounts of mineral oil are added. While sulfonated and sulfurized oils seem to have no effect on this solvent under the conditions used for vapor degreasing, methyl chloroform will decompose rapidly in the presence of a mineral oil so as to form large amounts of HCl and thus become worthless as a solvent.

It has now been found, however, that the corrosiveness and decomposition of this solvent due to the presence of a mineral oil can be eliminated, even under the conditions of vapor degreasing, when there is added thereto stabilizing quantities of an organic phosphorous compound selected from the group consisting of the phosphates and phosphines and mixtures thereof. By a stabilizing quantity is meant concentrations of at least 0.015 percent by volume. Unless otherwise specified all amounts herein set forth are in percent by volume. As the inhibiting action of the organic phosphate or phosphine is not appreciably affected by concentrations above 1 percent, concentrations greater than 10 percent are rarely used even though higher concentrations may be used without any deleterious effect on the solvent. The term "mineral oil" is used herein in its usual meaning of a naturally occurring oil of a petroleum source and particularly refers to aliphatic and olefinic hydrocarbons containing from 16 to 32 carbon atoms.

The inhibiting or stabilizing action of the organic phosphorous compounds is of value only when the solvent is also stabilized against metal-induced decomposition as taught in my prior applications referred to above. The propensity of the organic phosphorous compounds to stabilize methyl chloroform appears to be limited to degradation or decomposition induced by the presence of mineral oil. Methyl chloroform containing mineral oil and which is stabilized by an organic phosphorous compound but which contains no inhibitor for metal-induced decomposition, will decompose so rapidly and extensively in the presence of iron, aluminum or zinc that it is impossible to determine whether stabilization against mineral oil decomposition was affected.

The organic phosphorous compound as herein described may be added to methyl chloroform which contains minor amounts of inhibitors such as 1,4-dioxane and nitromethane, however, and a solvent is obtained which is virtually inert to all metals and to all oils and greases. This inert condition exists at elevated as well as normal temperatures and in vapor as well as liquid phase. The preferred concentrations of these inhibitors are from 0.5 to 10.0 percent 1,4-dioxane, and 0.25 to 3.0 percent nitromethane. The nitromethane in the above described composition may be replaced with a monohydric acetylenic alcohol containing less than 8 carbon atoms in the same concentration, but the nitromethane is preferred.

In the new compositions, the organic phosphorous compounds as herein used are defined as a member selected from the group consisting of di and tri substituted phosphates and phosphines having, respectively, the general formulas as follows:

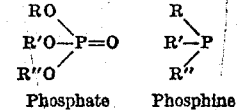

Phosphate   Phosphine wherein R and R′ are selected from the group consisting of alkyl radicals and aryl radicals, and R" is selected from the group consisting of alkyl radicals, and aryl radicals and hydrogen. The alkyl radical normally contains from one to sixteen carbon atoms as represented by triethyl phosphate, diethyl phosphate, trihexyl phosphate, diethylbutyl phosphate, and dicetylhexyl phosphate, although alkyl radicals containing from 1 to 5 carbon atoms are preferred. The aryl radicals are restricted to benzene derivatives having hydrocarbon substituents on the benzene ring containing no more than 7 carbon atoms, and preferably no more than 4 carbon atoms, in any given substituent, as illustrated by triphenyl phosphate, tricresyl phosphate, and tricresyl phosphine.

*Example I*

To demonstrate the problem of decomposition of methyl chloroform in the presence of mineral oil, a test run was made. To a 40 gallon vapor degreaser was added methyl chloroform containing 4.5 percent 1,4-dioxane and 0.25 percent nitromethane. Strips of galvanized iron, black iron, aluminum and copper were suspended in both the liquid and vapor phase. The degreaser was then heated to reflux and at the end of 4 weeks, no corrosion was observed on any of the metals. Then, however, a quantity of mineral oil was added which was equal to 5 percent of the methyl chloroform. This caused a heavy fog to form above the solvent and the zinc on the galvanized iron was quickly dissolved away. In less than 8 hours, the methyl chloroform had decomposed so completely that it was no longer suitable as a solvent. The iron was corroded and tar was formed in the solvent.

The degreaser was drained, cleaned and recharged with methyl chloroform containing 4.5 percent 1,4-dioxane, 0.25 percent nitromethane and 0.25 triethyl phosphate. Strips of galvanized iron, black iron, aluminum and copper were suspended so as to be in contact with both liquid and vapor phases as before. The solvent was then heated to boiling and a quantity of mineral oil was added which was equal to 5.0 percent of the methyl chloroform. No fog was noticed and no attack on the zinc was noted at the end of one week. Additional mineral oil was added which was equal to 35 percent of the methyl chloroform and even this failed to adversely affect the solvent. At the end of six weeks of continuous operation, no corrosion was detectable on any of the metal test strips and analysis showed less than 5 p.p.m. acid in the solvent. The color had changed from water white to a light straw yellow and the contents of the degreaser had a pleasant odor resembling that of apple cider.

*Example II*

A 40 gallon vapor degreaser was charged with methyl chloroform containing 4.5 percent 1,4-dioxane, 0.25 percent nitromethane and 0.25 percent secondary butyl alcohol by volume. To this was added 0.25 percent of tricresyl phosphate and the solvent was heated to boiling. Strips of galvanized iron, black iron, aluminum and copper were suspended in the bath so as to be in contact with both the liquid and vapor phases. Mineral oil was then added to the bath in a quantity equal to 5 percent of the methyl chloroform. No fog was noticed and no attack on the zinc was noted at the end of a week. Additional mineral oil was now added to bring the concentration up to 25 percent of the methyl chloroform. At the end of a total time of 60 days of continuous operation, no corrosion was detectable on any of the metal test strips and analysis showed less than 5 p.p.m. acid in the solvent.

*Example III*

The procedure of Example II was used except that triphenyl phosphine was used in the place of tricresyl phosphate. The addition of mineral oil up to 25 percent of the solvent failed to cause any detectable corrosion on any of the metal strips and analysis showed less than 5 p.p.m. acid in the methyl chloroform at the end of 60 days of continuous operation.

I claim:

1. A composition of matter consisting essentially of methyl chloroform containing a minor amount of 1,4-dioxane sufficient to stabilize the methyl chloroform against metal-induced decomposition and having dissolved therein a stabilizing amount, sufficient to stabilize the methyl chloroform containing the 1,4-dioxane against decomposition of the methyl chloroform in the presence of mineral oil, of an organic phosphorus compound selected from a group consisting of phosphates having the general formula:

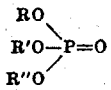

and phosphines having the general formula:

wherein R and R' are members of the group consisting of alkyl radicals containing atom 1 to 16 carbon atoms, the phenyl radical, and alkyl phenyl radicals having alkyl substituents of from 1 to 7 carbon atoms and wherein R" is a member of the group consisting of hydrogen alkyl radicals containing from 1 to 16 carbon atoms, the phenyl radical, and alkyl phenyl radicals having alkyl substituents of from 1 to 7 carbon atoms.

2. A metal degreasing composition consisting essentially of methyl chloroform, 0.5 to 10 volume percent of 1,4-dioxane and from 0.015 to 10 volume percent of an organic phosphorus compound selected from the group consisting of organic phosphates having the general formula:

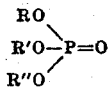

and phosphines having the general formula:

wherein R and R' are members of the group consisting of alkyl radicals containing from 1 to 16 carbon atoms, the phenyl radical, and alkyl phenyl radicals having alkyl substituents of from 1 to 7 carbon atoms and wherein R" is a member of the group consisting of hydrogen, alkyl radicals containing from 1 to 16 carbon atoms, the phenyl radical, and alkyl phenyl radicals having alkyl substituents of from 1 to 7 carbon atoms.

3. A solvent composition consisting essentially of methyl chloroform, containing from 0.5 to 10 volume percent of 1,4-dioxane, from 0.25 to 3 percent by volume of a monohydric acetylenic alcohol containing less than 8 carbon atoms, and from 0.015 to 10 percent by volume of an organic phosphorus compound selected from the group consisting of phosphates having the general formula:

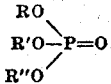

and phosphines having the general formula:

wherein R and R' are members of the group consisting of alkyl radicals containing from 1 to 16 carbon atoms, the phenyl radical, and alkyl phenyl radicals having alkyl substituents of from 1 to 7 carbon atoms and wherein R" is a member of the group consisting of hydrogen, alkyl radicals containing from 1 to 16 carbon atoms, the phenyl radical, and alkyl phenyl radicals having alkyl substituents of from 1 to 7 carbon atoms.

4. A metal degreasing solvent composition consisting essentially of methyl chloroform, 0.5 to 10 volume percent of 1,4-dioxane, 0.25 to 3.0 volume percent of nitromethane and 0.015 to 10 volume percent of an organic phosphorus compound selected from the group consisting of phosphates having the general formula:

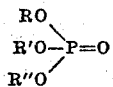

and phosphines having the general formula:

wherein R and R' are members of the group consisting of alkyl radicals containing from 1 to 16 carbon atoms, the phenyl radical, and alkyl phenyl radicals having alkyl substituents of from 1 to 7 carbon atoms and wherein R'' is a member of the group consisting of hydrogen, alkyl radicals containing from 1 to 16 carbon atoms, the phenyl radical, and alkyl phenyl radicals having alkyl substituents of from 1 to 7 carbon atoms.

5. A metal degreasing solvent composition according to claim 4 wherein the organic phosphorus compound is triethyl phosphate.

6. A metal degreasing solvent composition according to claim 4 wherein the organic phosphorus compound is tricresyl phosphate.

7. A metal degreasing solvent composition according to claim 4 wherein the organic phosphorus compound is triphenyl phosphate.

8. A method of degreasing metal surfaces which comprises subjecting the surface to the action of a composition consisting essentially of methyl chloroform, 1,4 dioxane in an amount of from 0.5 to 10 volume percent, a monohydric acetylenic alcohol containing less than 8 carbon atoms in an amount of from 0.25 to 3 volume percent, and an organic phosphorus compound in an amount of from 0.015 to 10 volume percent selected from the group consisting of phosphates having the general formula:

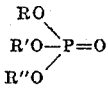

and phosphines having the general formula:

wherein R and R' are members of the group consisting of alkyl radicals containing from 1 to 16 carbon atoms, the phenyl radical, and alkyl phenyl radicals having alkyl substituents of from 1 to 7 carbon atoms and wherein R'' is a member of the group consisting of hydrogen, alkyl radicals containing from 1 to 16 carbon atoms, the phenyl radical, and alkyl phenyl radicals having alkyl substituents of from 1 to 7 carbon atoms.

9. A method of degreasing metal objects according to claim 8 wherein the organic phosphorus compound is triethyl phosphate.

10. A method of degreasing metal objects according to claim 8 wherein the organic phosphorus compound is tricresyl phosphate.

11. A method of degreasing metal objects according to claim 8 wherein the organic phosphorus compound is triphenyl phosphate.

References Cited in the file of this patent

UNITED STATES PATENTS

| 1,825,358 | Lovell et al. | Sept. 29, 1931 |
| 1,948,045 | Parkhurst | Feb. 20, 1934 |
| 2,281,598 | Prutton | May 5, 1942 |
| 2,298,638 | Prutton | Oct. 13, 1942 |
| 2,371,645 | Aitchison et al. | Mar. 20, 1945 |
| 2,371,646 | Petering et al. | Mar. 20, 1945 |
| 2,371,647 | Petering et al. | Mar. 20, 1945 |
| 2,407,149 | Gardenier | Sept. 3, 1946 |
| 2,704,278 | Gamreth | Mar. 15, 1955 |
| 2,838,458 | Bachtel | June 10, 1958 |

FOREIGN PATENTS

| 693,792 | Great Britain | July 8, 1953 |